(12) United States Patent
Nair et al.

(10) Patent No.: US 7,966,642 B2
(45) Date of Patent: Jun. 21, 2011

(54) RESOURCE-ADAPTIVE MANAGEMENT OF VIDEO STORAGE

(76) Inventors: Ajith N. Nair, Lawrenceville, GA (US); Douglas F. Woodhead, Suwanee, GA (US); Arturo A. Rodriguez, Norcross, GA (US); David B. Burleson, Duluth, GA (US)

( * ) Notice: Subject to any disclaimer, the term of this patent is extended or adjusted under 35 U.S.C. 154(b) by 1451 days.

(21) Appl. No.: 10/663,037

(22) Filed: Sep. 15, 2003

(65) Prior Publication Data

US 2005/0074063 A1 Apr. 7, 2005

(51) Int. Cl.
*H04N 7/16* (2006.01)
(52) U.S. Cl. ........ 725/142; 725/131; 725/134; 725/139; 725/151; 375/240.25; 386/109; 386/111; 386/125
(58) Field of Classification Search .................. 725/131, 725/139; 375/240.11, 240.12, 240.25, 240.15; 386/109
See application file for complete search history.

(56) References Cited

U.S. PATENT DOCUMENTS

| | | |
|---|---|---|
| 4,216,504 A | 8/1980 | Boussina et al. |
| 4,504,852 A | 3/1985 | Ducret |
| 4,881,125 A | 11/1989 | Krause |
| 5,187,575 A | 2/1993 | Lim |
| 5,218,435 A | 6/1993 | Lim et al. |
| 5,262,854 A | 11/1993 | Ng |
| 5,329,309 A | 7/1994 | Dorricott et al. |
| 5,377,051 A | 12/1994 | Lane et al. |
| 5,426,464 A | 6/1995 | Casavant et al. |
| 5,444,491 A | 8/1995 | Lim |
| 5,485,210 A | 1/1996 | Lim et al. |
| 5,606,359 A | 2/1997 | Youden et al. |
| 5,614,952 A | 3/1997 | Boyce et al. |
| 5,646,693 A | 7/1997 | Cismas |
| 5,703,966 A | 12/1997 | Astle |
| 5,742,829 A | 4/1998 | Davis et al. |
| 5,748,789 A | 5/1998 | Lee et al. |
| 5,764,992 A | 6/1998 | Kullick |
| 5,812,787 A | 9/1998 | Astle |
| 5,828,370 A | 10/1998 | Moeller et al. |
| 5,835,149 A | 11/1998 | Astle |
| 5,835,151 A | 11/1998 | Sun et al. |
| 5,836,003 A | 11/1998 | Sadeh |
| 5,844,620 A | 12/1998 | Coleman et al. |
| 5,929,911 A | 7/1999 | Cheney et al. |

(Continued)

FOREIGN PATENT DOCUMENTS

DE 198 10 814 A1 9/1999

(Continued)

OTHER PUBLICATIONS

Canadian Office Action cited in Application No. 2,472,244 mailed Apr. 3, 2008.

(Continued)

*Primary Examiner* — Andrew Y Koenig
*Assistant Examiner* — Junior O Mendoza
(74) *Attorney, Agent, or Firm* — Merchant & Gould, P.C.

(57) ABSTRACT

A method for providing adaptive video compression includes encoding a video stream in a first compressed format, storing the video stream in a storage device, retrieving the video stream from the storage device, decoding the video stream, encoding the video stream in a second compressed format, and storing the video stream in the storage device. Systems and other methods for providing adaptive video compression are also disclosed.

39 Claims, 8 Drawing Sheets

U.S. PATENT DOCUMENTS

| | | |
|---|---|---|
| 5,953,506 A | 9/1999 | Kalra et al. |
| 5,956,026 A | 9/1999 | Ratakonda |
| 5,959,684 A | 9/1999 | Tan et al. |
| 5,982,360 A | 11/1999 | Wu et al. |
| 5,995,095 A | 11/1999 | Ratakonda |
| 6,006,034 A | 12/1999 | Heath et al. |
| 6,009,231 A | 12/1999 | Aoki et al. |
| 6,043,838 A | 3/2000 | Chen |
| 6,072,531 A | 6/2000 | Shibano |
| 6,072,532 A | 6/2000 | Chieh et al. |
| 6,084,908 A | 7/2000 | Chiang et al. |
| 6,137,948 A | 10/2000 | Moon et al. |
| 6,148,027 A | 11/2000 | Song et al. |
| 6,157,396 A | 12/2000 | Margulis et al. |
| 6,201,927 B1 | 3/2001 | Comer |
| 6,208,692 B1 | 3/2001 | Song et al. |
| 6,222,979 B1 | 4/2001 | Willis et al. |
| 6,233,253 B1 | 5/2001 | Settle et al. |
| 6,326,964 B1 | 12/2001 | Snyder et al. |
| 6,353,633 B1 | 3/2002 | Her |
| 6,360,015 B1 | 3/2002 | Bakhmutsky et al. |
| 6,400,764 B1 | 6/2002 | Bakhmutsky |
| 6,408,101 B1 | 6/2002 | Krishnamurthy et al. |
| 6,414,991 B1 | 7/2002 | Yagasaki et al. |
| 6,430,317 B1 | 8/2002 | Krishnamurthy et al. |
| 6,434,196 B1 | 8/2002 | Sethuraman et al. |
| 6,434,197 B1 | 8/2002 | Wang et al. |
| 6,441,754 B1 | 8/2002 | Wang et al. |
| 6,477,562 B2 | 11/2002 | Nemirovsky et al. |
| 6,532,593 B1 | 3/2003 | Moroney ............... 725/142 |
| 6,535,559 B2 | 3/2003 | Yagasaki et al. |
| 6,560,371 B1 | 5/2003 | Song et al. |
| 6,570,579 B1 | 5/2003 | MacInnis et al. |
| 6,608,625 B1 | 8/2003 | Chin et al. |
| 6,618,507 B1 | 9/2003 | Divakaran et al. |
| 6,643,328 B2 | 11/2003 | Yagasaki et al. |
| 6,654,539 B1 | 11/2003 | Druoz et al. |
| 6,658,157 B1 | 12/2003 | Satoh et al. |
| 6,658,199 B1 | 12/2003 | Hallberg |
| 6,671,322 B2* | 12/2003 | Vetro et al. ............. 375/240.16 |
| 6,671,454 B1* | 12/2003 | Kaneko et al. ............ 386/83 |
| 6,690,881 B1 | 2/2004 | Tomita et al. |
| 6,700,622 B2 | 3/2004 | Adams et al. |
| 6,735,253 B1 | 5/2004 | Chang et al. |
| 6,766,407 B1 | 7/2004 | Lisitsa et al. |
| 6,768,774 B1 | 7/2004 | MacInnis et al. |
| 6,847,778 B1 | 1/2005 | Vallone et al. |
| 6,876,703 B2 | 4/2005 | Ismaeil et al. |
| 6,909,749 B2 | 6/2005 | Yang et al. |
| 6,931,064 B2* | 8/2005 | Mori et al. ............. 375/240.16 |
| 6,996,838 B2 | 2/2006 | Rodriguez |
| 7,027,713 B1 | 4/2006 | Hallberg |
| 7,050,499 B2 | 5/2006 | Kodama et al. |
| 7,079,578 B2* | 7/2006 | Segev ..................... 375/240.12 |
| 7,154,560 B1 | 12/2006 | Chang et al. |
| 7,233,622 B2 | 6/2007 | Winger et al. |
| 7,274,857 B2 | 9/2007 | Nallur et al. |
| 7,302,002 B2 | 11/2007 | Yagasaki et al. |
| 7,324,595 B2 | 1/2008 | Cote et al. |
| 7,356,082 B1 | 4/2008 | Kuhn |
| 7,391,809 B2 | 6/2008 | Li et al. |
| 7,869,505 B2 | 1/2011 | Rodriguez et al. |
| 2001/0014206 A1* | 8/2001 | Artigalas et al. ............. 386/83 |
| 2002/0009149 A1 | 1/2002 | Rodriguez et al. |
| 2002/0039483 A1* | 4/2002 | Frost et al. ..................... 386/109 |
| 2002/0044762 A1 | 4/2002 | Wood et al. |
| 2002/0071663 A1* | 6/2002 | O'Donnel .................. 386/109 |
| 2003/0001964 A1* | 1/2003 | Masukura et al. ........... 348/441 |
| 2003/0066084 A1* | 4/2003 | Kaars ..................... 725/89 |
| 2003/0093800 A1 | 5/2003 | Demas et al. |
| 2003/0103604 A1 | 6/2003 | Kato et al. |
| 2003/0113098 A1 | 6/2003 | Willis |
| 2003/0147631 A1* | 8/2003 | Zimmermann .............. 386/95 |
| 2003/0170003 A1 | 9/2003 | Levesque et al. |
| 2003/0233663 A1* | 12/2003 | Rao et al. ..................... 725/131 |
| 2004/0055020 A1* | 3/2004 | Delpuch ....................... 725/134 |
| 2004/0218680 A1 | 11/2004 | Rodriguez et al. |
| 2005/0022245 A1 | 1/2005 | Nallur et al. |
| 2006/0013568 A1 | 1/2006 | Rodriguez |
| 2006/0093320 A1 | 5/2006 | Hallberg et al. |
| 2007/0286581 A1* | 12/2007 | Boston et al. ............... 386/109 |
| 2008/0037952 A1 | 2/2008 | Nallur et al. |
| 2008/0037957 A1 | 2/2008 | Nallur et al. |
| 2008/0253464 A1 | 10/2008 | Rodriguez et al. |
| 2008/0279284 A1 | 11/2008 | Rodriguez et al. |
| 2009/0033791 A1 | 2/2009 | Rodriguez et al. |
| 2010/0020878 A1 | 1/2010 | Liang |

FOREIGN PATENT DOCUMENTS

| | | |
|---|---|---|
| EP | 0 595 323 A2 | 5/1994 |
| EP | 1 026 899 A1 | 8/2000 |
| EP | 1 161 089 A2 | 12/2001 |
| EP | 1 195 995 A2 | 4/2002 |
| EP | 1195995 | 4/2002 |
| JP | 5-49000 | 2/1993 |
| JP | 10-243344 | 10/1998 |
| JP | 10-271498 | 10/1998 |
| JP | 11-18063 | 1/1999 |
| JP | 11-196411 | 7/1999 |
| JP | 02-500851 | 1/2002 |
| JP | 03-087785 | 3/2003 |
| JP | 03-102008 | 4/2003 |
| WO | WO 96/10889 | 4/1996 |
| WO | WO 97/15149 | 4/1997 |
| WO | WO 99/12097 | 3/1999 |
| WO | WO 99/22517 | 5/1999 |
| WO | WO0113625 | 1/2001 |
| WO | WO 01/13625 A1 | 2/2001 |
| WO | WO 02/43385 A2 | 5/2002 |

OTHER PUBLICATIONS

Canadian Office Action cited in Application No. 2,573,906 mailed Apr. 1, 2009.

EP Communication Pursuant to Article 94(3) EPC cited in 00 984 341.8 mailed May 19, 2009.

EP Communication Pursuant to Article 94(3) EPC cited in 02 794 331.5 mailed Jan. 12, 2009.

International Search Report cited in PCT/US00/33837 mailed Mar. 1, 2001.

International Search Report cited in PCT/US02/40828 mailed Apr. 21, 2003.

International Search Report and Written Opinion cited in PCT/US2004/030012 mailed Dec. 27, 2004.

International Search Report and Written Opinion cited in PCT/US2005/024706 mailed Oct. 18, 2005.

International Search Report and Written Opinion cited in PCT/US2008/070856 mailed Dec. 15, 2008.

Japanese Office Action cited in 2001-546180 mailed Mar. 30, 2007.

Japanese Office Action cited in 2001-546180 mailed Jun. 9, 2008.

Japanese Final Office Action cited in 2001-546180 mailed Jun. 18, 2009.

Richardson, I. et al., "Video codec complexity management," *Proc. International Picture Coding Symposium (PCS01)*, Seoul, Korea, 4 pages (Apr. 2001).

Topiwala, P., "Status of the emerging ITU-T/H.264 | ISO/MPEG-4, Part 10 Video coding standard," *Proceedings of SPIE*, vol. 4790, pp. 261-277 (Jul. 8, 2002).

Written Opinion cited in PCT/US00/33837 mailed Dec. 27, 2001.

Written Opinion cited in PCT/US02/40828 mailed Dec. 16, 2003.

U.S. Non-Final Office Action cited in U.S. Appl. No. 09/736,661 mailed Aug. 24, 2001.

U.S. Final Office Action cited in U.S. Appl. No. 09/736,661 mailed Apr. 10, 2002.

U.S. Non-Final Office Action cited in U.S. Appl. No. 09/736,661 mailed Mar. 26, 2003.

U.S. Non-Final Office Action cited in U.S. Appl. No. 09/736,661 mailed Oct. 20, 2003.

U.S. Non-Final Office Action cited in U.S. Appl. No. 09/736,661 mailed Jul. 19, 2004.

U.S. Final Office Action cited in U.S. Appl. No. 09/736,661 mailed Sep. 22, 2005.

U.S. Non-Final Office Action cited in U.S. Appl. No. 09/736,661 mailed Jul. 17, 2006.
U.S. Final Office Action cited in U.S. Appl. No. 09/736,661 mailed Jan. 3, 2007.
U.S. Non-Final Office Action cited in U.S. Appl. No. 09/736,661 mailed Sep. 11, 2007.
U.S. Final Office Action cited in U.S. Appl. No. 09/736,661 mailed Apr. 11, 2008.
U.S. Non-Final Office Action cited in U.S. Appl. No. 09/736,661 mailed Jul. 29, 2008.
U.S. Non-Final Office Action cited in U.S. Appl. No. 09/736,661 mailed Mar. 3, 2009.
U.S. Non-Final Office Action cited in U.S. Appl. No. 10/854,874 mailed May 13, 2008.
U.S. Non-Final Office Action cited in U.S. Appl. No. 10/854,874 mailed Dec. 15, 2008.
U.S. Final Office Action cited in U.S. Appl. No. 10/854,874 mailed Jun. 11, 2009.
U.S. Non-Final Office Action cited in U.S. Appl. No. 10/891,318 mailed Mar. 19, 2009.
U.S. Appl. No. 12/180,501, filed Jul. 25, 2008, entitled "Transcoding for Systems Operating Under Plural Video Coding Specifications," Inventors: Liang et al.
Japanese Final Office Action cited in 2006-526399 mailed Sep. 29, 2009.
U.S. Non-Final Office Action cited in U.S. Appl. No. 09/736,661 mailed Sep. 16, 2009.
Canadian Office Action cited in Application No. 2,539,120 mailed Mar. 9, 2010.
EP Examination cited in 00 984 341.8 mailed Dec. 14, 2009.
EP Examination cited in 05 764 529.3 mailed Jun. 18, 2010.
International Preliminary Report on Patentability and Written Opinion cited in PCT/US2008/070856 mailed Feb. 2, 2010.
U.S. Final Office Action cited in U.S. Appl. No. 10/891,318 mailed Dec. 1, 2009.
U.S. Final Office Action cited in U.S. Appl. No. 09/736,661 mailed Mar. 9, 2010.
Canadian Office Action cited in Application No. 2,573,906 mailed Aug. 9, 2010.
U.S. Final Office Action cited in U.S. Appl. No. 10/623,683 mailed Jul. 25, 2008.
U.S. Non-Final Office Action cited in U.S. Appl. No. 10/623,683 mailed Dec. 28, 2007.
EP Examination cited in 08 150 948.1 mailed Dec. 17, 2010.
Simonson et al., "Version augmented URIs for reference permanencevia an Apache module design," Computer Networks and ISDN Systems, North Holland Publishing, Amsterdam, NL, vol. 30, Apr. 1-7, 1998, pp. 337-345.
U.S. Non-Final Office Action cited in U.S. Appl. No. 10/891,318 mailed Mar. 15, 2011.

* cited by examiner

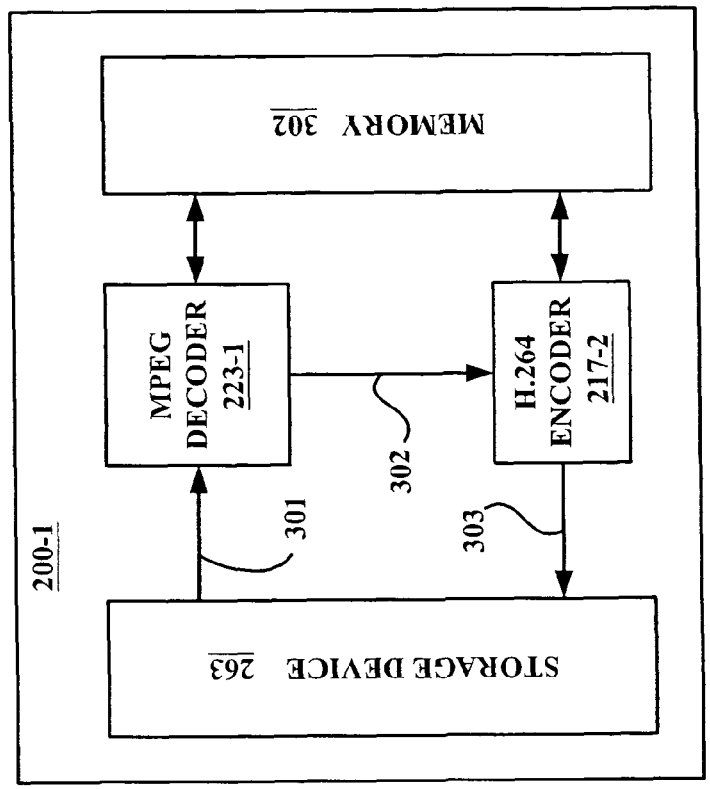
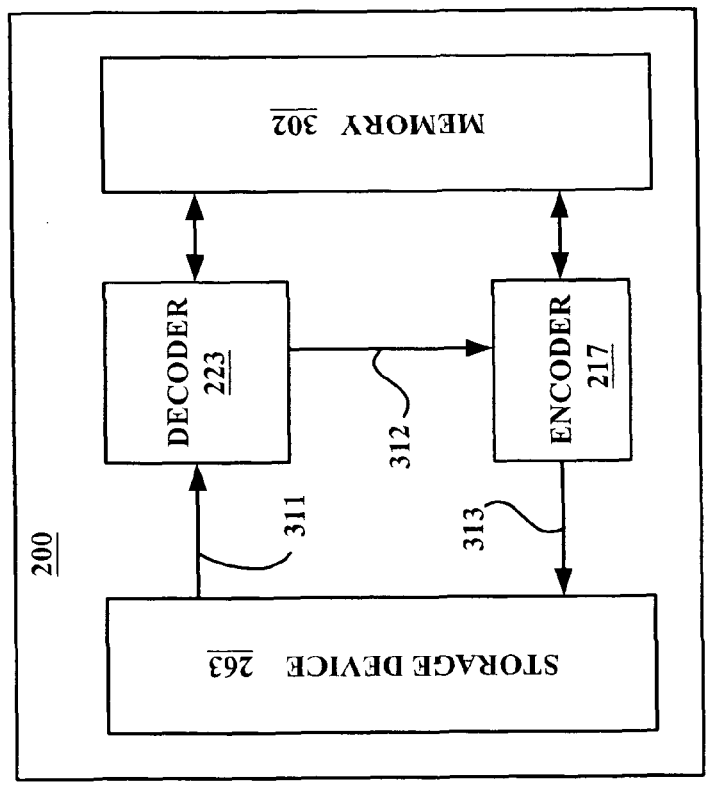
FIG. 3B
FIG. 3A

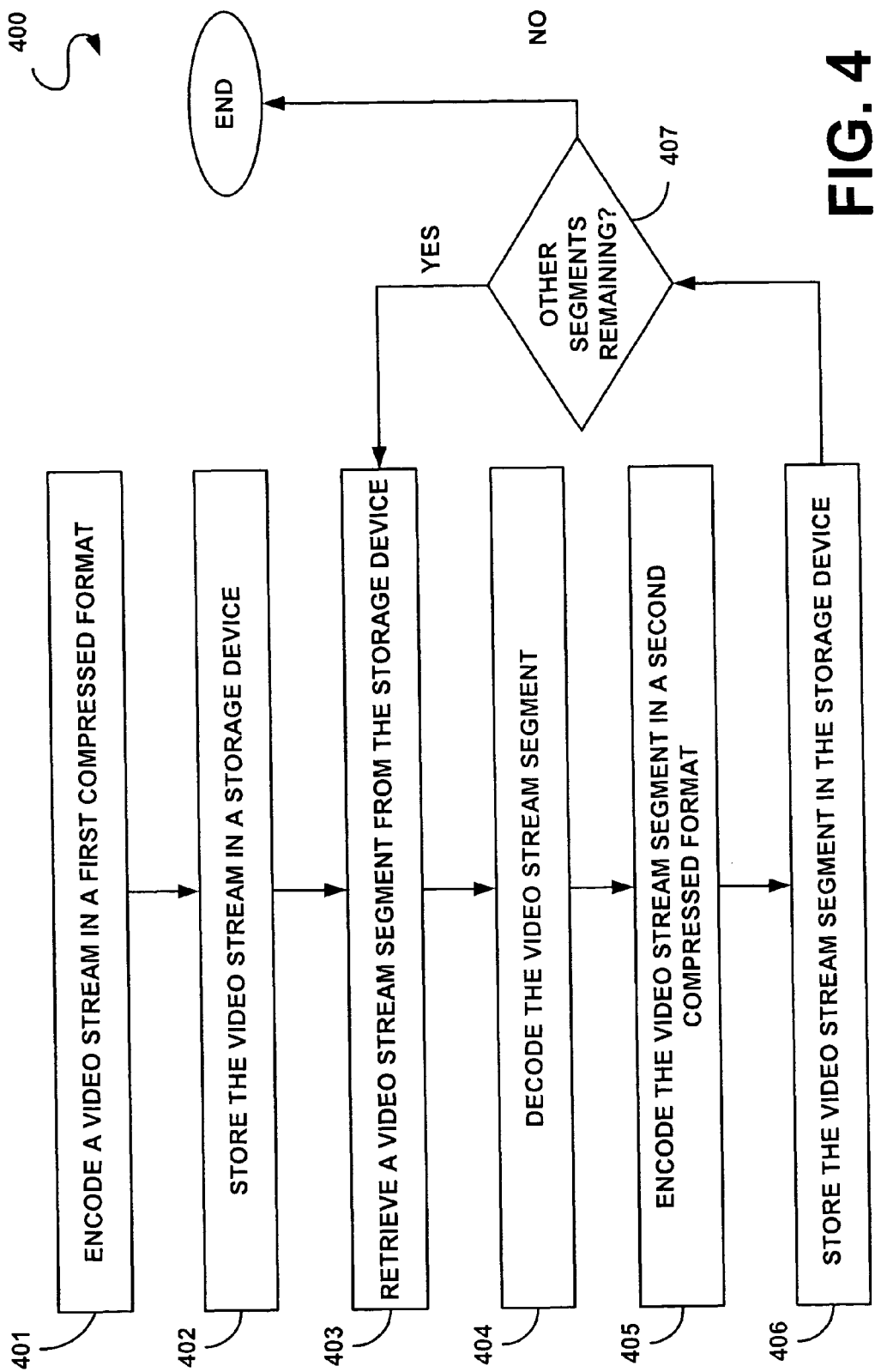

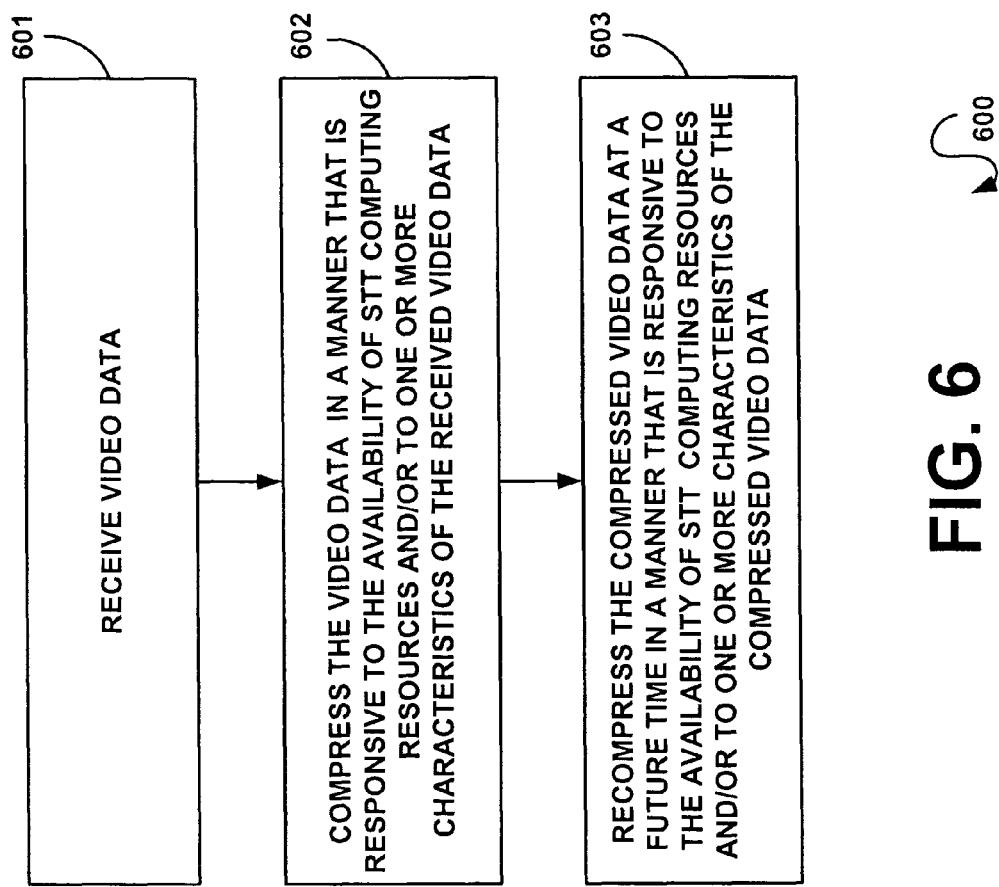

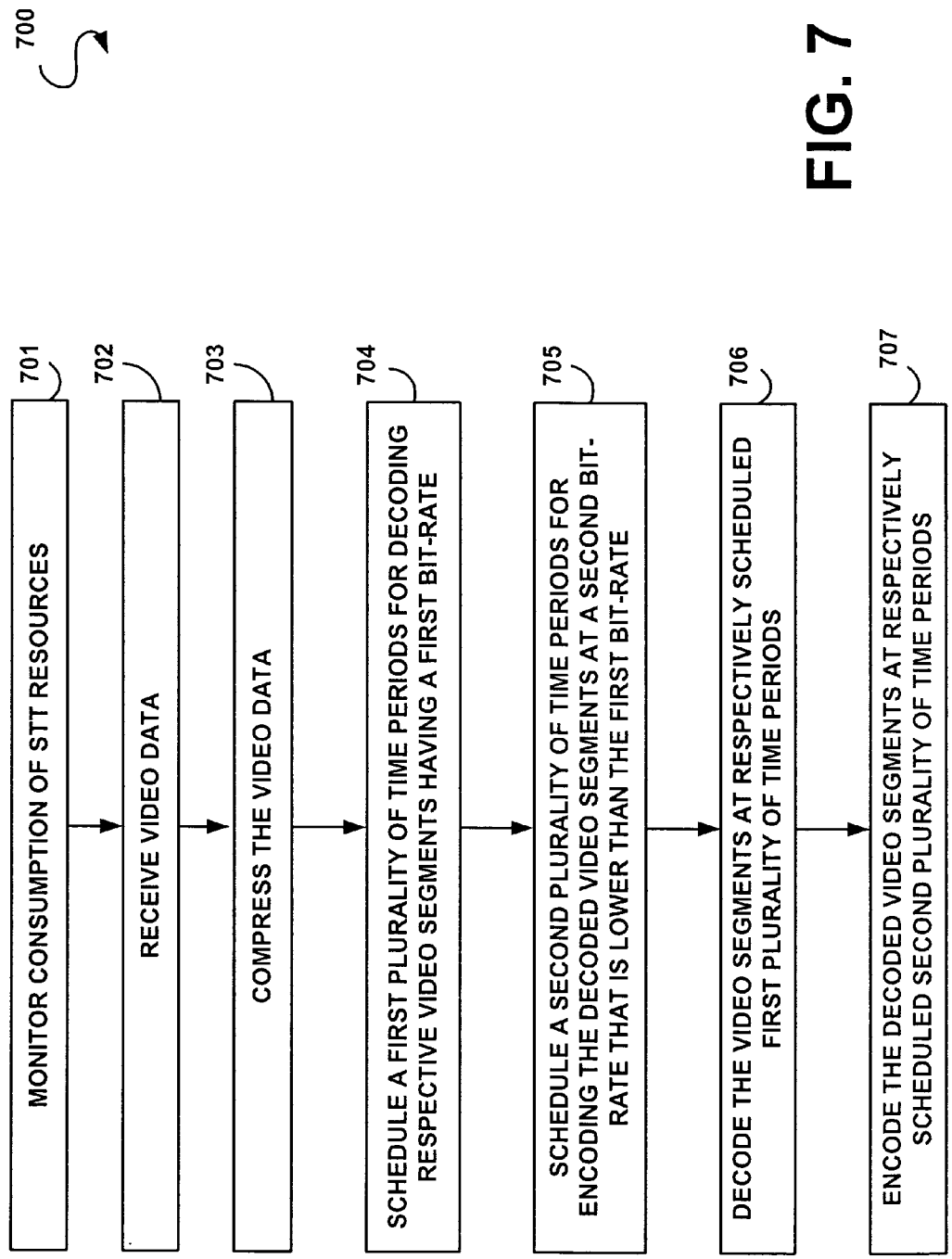

RESOURCE-ADAPTIVE MANAGEMENT OF VIDEO STORAGE

FIELD OF THE INVENTION

The present invention is generally related to video, and more particularly related to video compression.

BACKGROUND OF THE INVENTION

It is desirable for television set-top terminals (STTs) to be able to store a large number of video presentations (e.g., movies) in digital form. One way to enable a STT to store a large number of digital video presentations is to include in the STT a storage device having a storage capacity sufficient to accommodate a large number of video presentations. This approach, however, may not be cost effective and/or may not enable the storage of as many video presentations as desired by a user. Therefore, there exists a need for systems and methods for addressing this and/or other problems associated with the storage of digital video presentations.

BRIEF DESCRIPTION OF THE DRAWINGS

Embodiments of the invention can be better understood with reference to the following drawings. The components in the drawings are not necessarily drawn to scale, emphasis instead being placed upon clearly illustrating the principles of the present invention. In the drawings, like reference numerals designate corresponding parts throughout the several views.

FIGS. 3A-3D are block diagrams illustrating examples of data flows in a STT.

FIG. 4 is a flow chart depicting a non-limiting example of a video re-compression method that is implemented by the STT depicted in FIG. 1, according to an embodiment of the invention.

FIG. 6 is a flow chart depicting a non-limiting example of a video re-compression method that is implemented by the STT depicted in FIG. 1, according to yet another embodiment of the invention.

FIG. 7 is a flow chart depicting a non-limiting example of a video re-compression method that is implemented by the STT depicted in FIG. 1, according to a further embodiment of the invention.

DETAILED DESCRIPTION OF THE PREFERRED EMBODIMENTS

Preferred embodiments of the invention can be understood in the context of a set-top terminal (STT) in a subscriber television system. In one embodiment of the invention, a non-compressed digitized video sequence is encoded in a first compressed format and is stored in a storage device as a video stream. At a later time, segments comprising a plurality of compressed pictures of the video stream are retrieved from the storage device in a sequential manner from a starting point and then decoded and reconstructed into respective non-compressed digitized pictures. After one or more pictures in the video stream are decoded and stored in memory, they are encoded into a second compressed format and stored in the storage device. A portion of the video stream that is in a first compressed format, and for which a copy has been created in a second compressed format, may be deleted. The second compressed format allows the video stream to be encoded using fewer bits, and, as a result, less storage capacity is used for storing the video stream. This and other embodiments will be described in more detail below with reference to the accompanying drawings.

Figure 1:
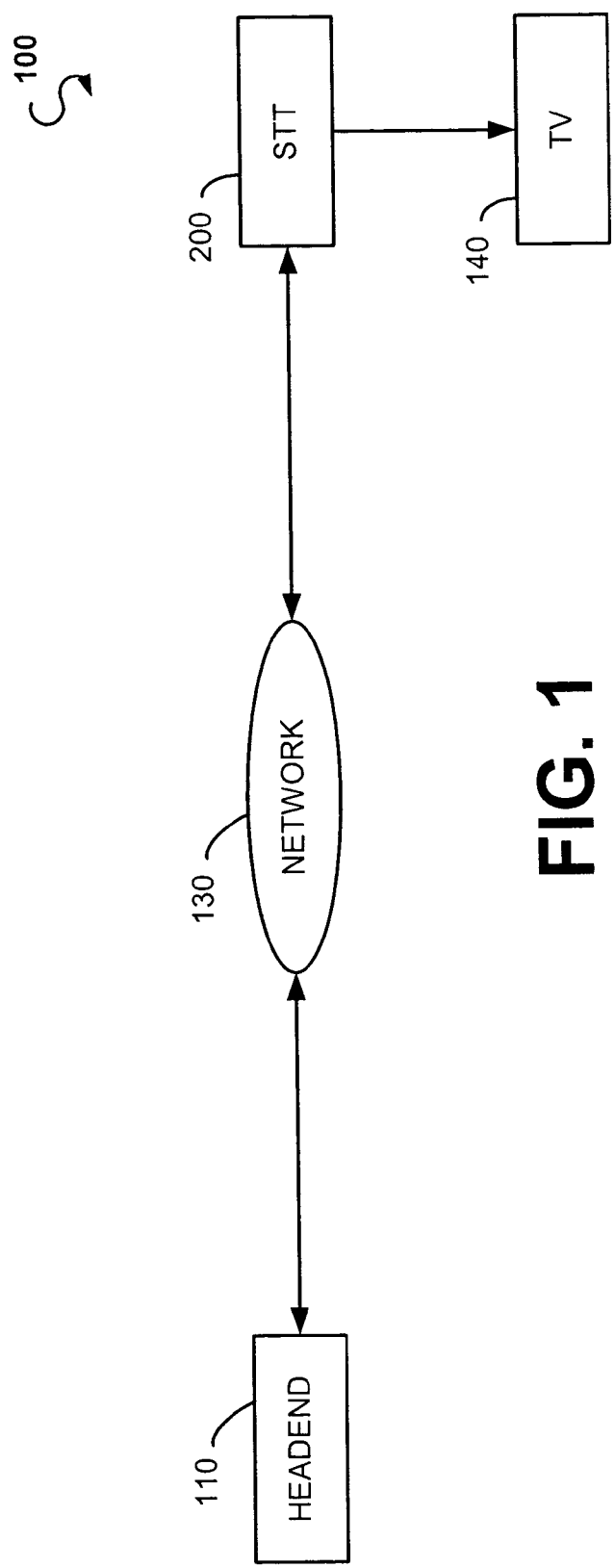
FIG. 1 is a high-level block diagram depicting a non-limiting example of a subscriber television system.
Figure 2:
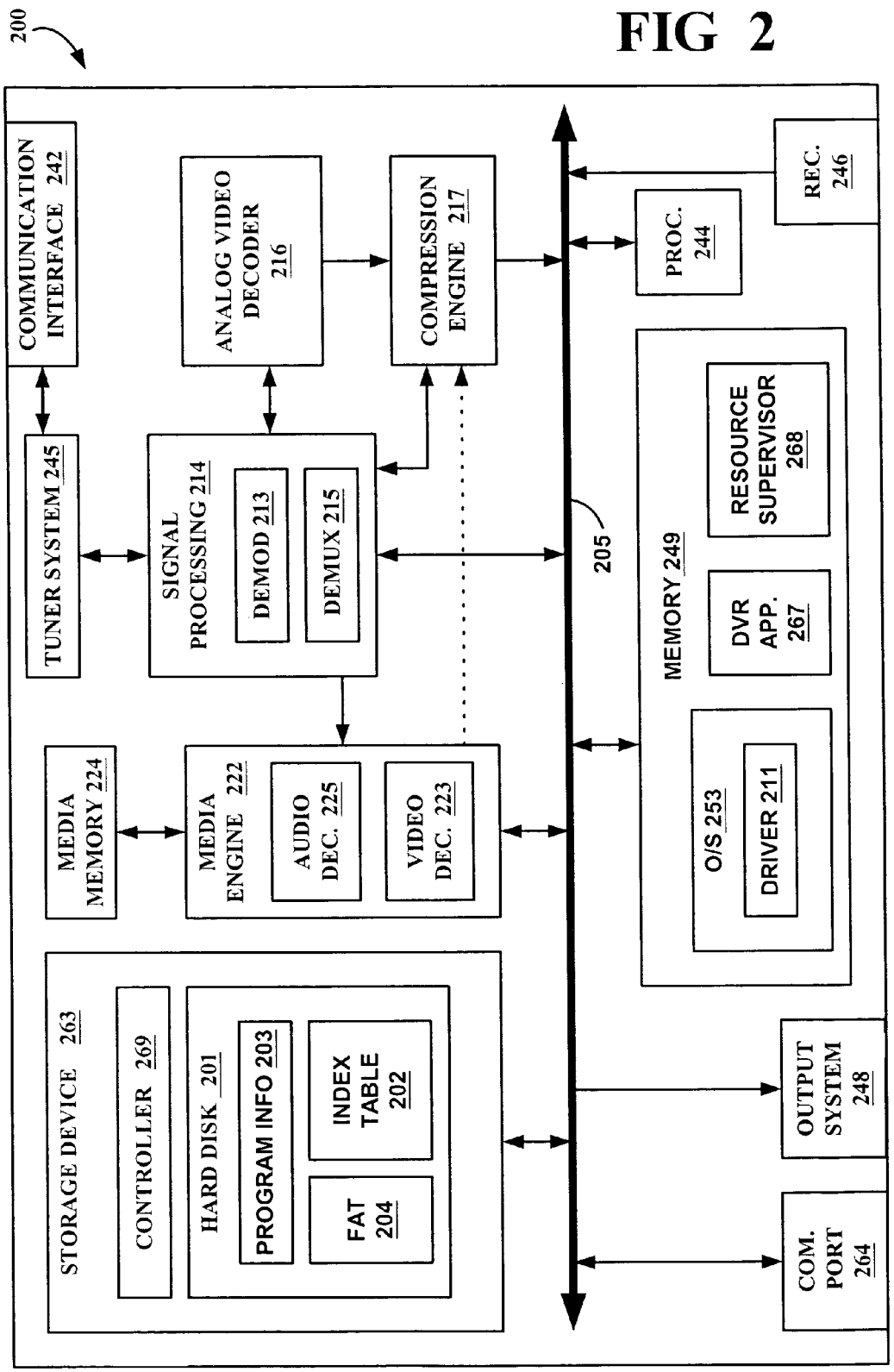
FIG. 2 is a block diagram of a STT in accordance with one embodiment of the present invention.

The accompanying drawings include FIGS. 1-7: FIG. 1 provides an example, among others, of a subscriber television system in which adaptive video compression may be implemented; FIG. 2 provides an example, among others, of a STT that may be used to perform adaptive video compression; FIGS. 3A-3D are block diagrams illustrating examples, among others, of data flow pursuant to adaptive video compression in a STT; and FIGS. 4-7 are flow charts depicting methods, among others, that can be used in implementing adaptive video compression in a STT. Note, however, that the invention may be embodied in many different forms and should not be construed as limited to the embodiments set forth herein. Furthermore, all examples given herein are intended to be non-limiting, among others, and are provided in order to help clarify the invention.

FIG. 1 is a block diagram depicting a non-limiting example of a subscriber television system 100. Note that the subscriber television system 100 shown in FIG. 1 is merely illustrative and should not be construed as implying any limitations upon the scope of the preferred embodiments of the invention. In this example, the subscriber television system 100 includes a headend 110 and a STT 200 that are coupled via a network 130. The STT 200 is typically situated at a user's residence or place of business and may be a stand-alone unit or integrated into another device such as, for example, the television 140.

The headend 110 and the STT 200 cooperate to provide a user with television functionality including, for example, television programs, an interactive program guide (IPG), and/or video-on-demand (VOD) presentations. The headend 110 may include one or more server devices (not shown) for providing video, audio, and textual data to client devices such as STT 200. The headend 110 may further provide authorization signals or messages that enable the STT 220 to perform corresponding authorized functionality.

The STT 200 receives signals (video, audio and/or other data) including, for example, MPEG-2 streams, among others, from the headend 110 through the network 130 and provides any reverse information to the headend 110 through the network 130. The network 130 may be any suitable means for communicating television services data including, for example, a cable television network or a satellite television network, among others.

FIG. 2 is a block diagram illustrating selected components of a STT 200 in accordance with one embodiment of the present invention. Note that the STT 200 shown Apr. 7, 2005 in FIG. 2 is merely illustrative and should not be construed as implying any limitations upon the scope of the preferred embodiments of the invention. For example, in another embodiment, the STT 200 may have fewer, additional, and/or different components than illustrated in FIG. 2.

The STT 200 preferably includes at least one processor 244 for controlling operations of the STT 200, an output system 248 for driving the television 140, and a tuner system 245 for tuning to a particular television channel or frequency and for sending and receiving various types of data to/from the headend 110. The STT 200 may, in another embodiment, include multiple tuners for receiving downloaded (or transmitted)

data. The tuner system 245 enables the STT 200 to tune to downstream media and data transmissions, thereby allowing a user to receive digital or analog signals. The tuner system 245 includes, in one implementation, an out-of-band tuner for bi-directional quadrature phase shift keying (QPSK) data communication and a quadrature amplitude modulation (QAM) tuner (in band) for receiving television signals. Additionally, a receiver 246 receives externally-generated user inputs or commands from an input device such as, for example, a remote control.

In one implementation, video streams are received in STT 200 via communication interface 242 (e.g., a coaxial cable interface) and stored in a temporary memory cache. The temporary memory cache may be a designated section of memory 249 or another memory device connected directly to the communication interface 242. Such a memory cache may be implemented and managed to enable data transfers to storage device 263.

The STT 200 may include one or more wireless or wired interfaces, also called communication ports 264, for receiving and/or transmitting data to other devices. For instance, the STT 200 may feature USB (Universal Serial Bus), Ethernet, IEEE-1394, serial, and/or parallel ports, etc. STT 200 may also include an analog video input port for receiving analog video signals.

Input video streams and/or signals may be received by the STT 200 from different sources. For example, an input video stream or signal may comprise any of the following, among others:
1- Broadcast analog video signals that are received from a headend 110 via network communication interface 242.
2- Analog video signals that are received from a consumer electronics device (e.g., an analog video camcorder) via analog audio and video connectors (not shown) such as, for example, S-Video input or composite video input.
3- A broadcast or on-demand digital video stream that is received from a headend 110 via network communication interface 242.
4- A digital video stream that is received from a digital consumer electronic device (such as a personal computer or a digital video camcorder) via a digital video interface or a home network interface such as USB, IEEE-1394 or Ethernet.
5- A digital video stream that is received from an externally connected storage device (e.g., a DVD player) via a digital video interface or a communication interface such as IDE, SCSI, USB, IEEE-1394 or Ethernet.

The STT 200 includes signal processing system 214, which comprises a demodulating system 213 and a transport demultiplexing and parsing system 215 (herein referred to as the demultiplexing system 215) for processing broadcast media content and/or data. One or more of the components of the signal processing system 214 can be implemented with software, a combination of software and hardware, or hardware (e.g., an application specific integrated circuit (ASIC)).

Demodulating system 213 comprises functionality for demodulating analog or digital transmission signals. For instance, demodulating system 213 can demodulate a digital transmission signal in a carrier frequency that was modulated as a QAM-modulated signal. When tuned to a carrier frequency corresponding to an analog TV signal, the demultiplexing system 215 may be bypassed and the demodulated analog TV signal that is output by demodulating system 213 may instead be routed to analog video decoder 216.

The analog video decoder 216 converts the analog TV signal into a sequence of digitized pictures along with their respective digitized audio. The digitized pictures and respective audio are output by the analog video decoder 216 in sequential display order and presented at the input of a compression engine 217. Simultaneously, the digitized pictures and respective audio may be also output to television 140 via the output system 248. For instance, the digitized pictures and respective audio output by the analog video decoder 216 (in sequential display order) may be presented at the input of a digital encoder (DENC (not shown)) that resides in media engine 222, and then output from media engine 222 to the output system 248.

The compression engine 217 then converts the digital video and/or audio data into respective compressed video and audio streams according to a specified compression format. The format of the compressed audio and/or video streams may be produced in accordance with a video compression standard so that they can be interpreted by video decoder 223 and audio decoder 225 for decompression and reconstruction at a future time.

Examples, among others, of currently known compression standards can be found in the following publications, which are hereby incorporated herein by reference in their entirety:
(1) ISO/IEC International Standard IS 11172-2, "Information technology—Coding of moving pictures and associated audio for digital storage media at up to about 1.5 Mbits/s-Part 2: video," 1993;
(2) ITU-T Recommendation H-262 (1996): "Generic coding of moving pictures and associated audio information: Video," (ISO/IEC 13818-2);
(3) ITU-T Recommendation H.261 (1993): "Video codec for audiovisual services at px64 kbits/s"; and
(4) Draft ITU-T Recommendation H.263 (1995): "Video codec for low bitrate communications."
(5) Draft ITU-T Recommendation H.264 (2003) (ISO/IEC 14496-10).

In one embodiment, compression engine 217 is capable of receiving N digitized picture sequences, compressing, and outputting N compressed video streams with associated audio in parallel and in real-time. As used herein, N is a positive integer greater than 1 that characterizes the maximum number of compression operations in real-time that compression engine 217 is capable of performing. Each compressed stream may be compressed in one of a plurality of compression formats that are compatible with the capabilities of compression engine 217. Furthermore, each compressed stream may comprise a sequence of data packets containing a header and a payload. Each header may include a unique packet identification code (PID) associated with the respective compressed stream.

Compression engine 217 multiplexes the audio and video compressed streams into a transport stream, such as, for example, an MPEG-2 transport stream. Furthermore, compression engine 217 can be configured to compress audio and video corresponding to more than one video program in parallel (e.g., two tuned analog TV signals when STT 200 has multiple tuners), and to multiplex the respective audio and video compressed streams into a single transport stream. The output of compression engine 217 may be provided to the signal processing system 214. Note that video and audio data may be temporarily stored in memory 249 by one module prior to being retrieved and processed by another module.

Demultiplexing system 215 can include MPEG-2 transport demultiplexing. When tuned to carrier frequencies carrying a digital transmission signal, demultiplexing system 215 enables the extraction of packets of data corresponding to the desired video streams. Therefore, demultiplexing system 215 can preclude further processing of data packets corresponding to undesired video streams.

The components of signal processing system 214 are preferably capable of QAM demodulation, forward error correction, demultiplexing MPEG-2 transport streams, and parsing packetized elementary streams. The signal processing system 214 is also capable of communicating with processor 244 via interrupt and messaging capabilities of STT 200. Compressed video and audio streams that are output by the signal processing 214 can be stored in storage device 263, or can be provided to media engine 222, where they can be decompressed by the video decoder 223 and audio decoder 225 prior to being output to the television 140 (FIG. 1). In one embodiment, compressed video and audio streams that are output by the signal processing system 214 are stored in storage device 263 and simultaneously provided to media engine 222, where they are decompressed by the video decoder 223 and audio decoder 225 prior to being output to the television 140 (FIG. 1).

One having ordinary skill in the art will appreciate that signal processing system 214 may include other components not shown, including memory, decryptors, samplers, digitizers (e.g. analog-to-digital converters), and multiplexers, among others. Furthermore, components of signal processing system 214 can be spatially located in different areas of the STT 200, among others.

Demultiplexing system 215 parses (i.e., reads and interprets) compressed streams to interpret sequence headers and picture headers, and deposits a transport stream carrying compressed streams into memory 249. The processor 244 interprets the data output by signal processing system 214 and generates ancillary data in the form of a table or data structure comprising the relative or absolute location of the beginning of certain pictures in the compressed video stream. In one embodiment, such ancillary data is used to identify the beginning of segments comprising consecutive pictures in a compressed stream, and to facilitate access to one or more of such segments. The ancillary data may, for example, facilitate a plurality of playback modes starting from a correct location in a video stream. The plurality of playback modes, also known as trick modes or random access operations, may include, for example, fast forward, slow forward play, normal speed play, fast reverse play, slow reverse play, and rewind. Each segment of compressed pictures may be retrieved and converted from a first video compression format to a second video compression format.

A first compressed stream encoded with the first compression format can be generated by compression engine 217 at an earlier time or could possibly be generated by a different and unknown compression engine and received by STT 200 via a communication port such as, for example, communication interface 242. The first compression format may be characterized by a first compression computational complexity and a first decompression computational complexity. A second compression format may be characterized by a second compression computational complexity and a second decompression computational complexity. Compressing or decompressing a video segment having the second format requires more STT 200 resources than compressing or decompressing a corresponding video segment having the first format.

As will be described in more detail below, in a first operating mode, conversion or transcoding is performed segment by segment, on a non-real time basis by accessing one segment of a first compressed video stream at a time from storage device 263. According to one embodiment of the invention, the speed of a transcoding operation is determined by the amount of available resources in the STT 200 (e.g., memory, memory bus bandwidth, and encoder processing).

As will be described in more detail below, in a second operating mode, a transcoding operation is performed in real-time by accessing consecutive segments of a first compressed stream from storage device 263 in an orchestrated fashion according to the availability of resources in the STT 200. Note that consecutive pictures in any compressed stream are not necessarily in a picture display order but may be ordered according to the syntax and semantics of the respective video compression format employed to encode the compressed stream.

In one embodiment of the invention, a plurality of tuners and respective demodulating systems 213, demultiplexing systems 215, and signal processing systems 214 may simultaneously receive and process a plurality of respective broadcast digital video streams. Alternatively, a single demodulating system 213, a single demultiplexing system 215, and a single signal processing system 214, each with sufficient processing capabilities may be used to process a plurality of digital video streams.

In yet another embodiment, a first tuner in tuning system 245 receives an analog video signal corresponding to a first video channel and a second tuner simultaneously receives a digital compressed stream corresponding to a second video channel. The video signal of the first video channel is converted into a digital format. The second video stream and/or a compressed digital version of the first video stream may be stored in the storage device 263. Data annotations for each of the two streams may be performed to facilitate future retrieval of the video streams from the storage device 263. The first video stream and/or the second video stream may also be routed to media engine 222 for decoding and subsequent presentation via television 140 (FIG. 1).

A plurality of compression engines 217 may be used to simultaneously compress a plurality of analog video programs. Alternatively, a single compression engine 217 with sufficient processing capabilities may be used to compress a plurality of analog video programs. Compressed digital versions of respective analog video programs may be stored in the storage device 263. Data annotations for each generated compressed video stream may be performed to facilitate future retrieval of the video streams from storage device 263 (e.g., for performing a transcoding operation).

The STT 200 includes at least one storage device 263 for storing video streams received by the STT 200. The storage device 263 may be any type of electronic storage device including, for example, a magnetic, optical, or semiconductor based storage device. The storage device 263 preferably includes at least one hard disk 201 and a controller 269. A (digital video recorder) DVR application 267, in cooperation with the device driver 211, effects, among other functions, read and/or write operations to the storage device 263. The controller 269 receives operating instructions from the device driver 211 and implements those instructions to cause read and/or write operations to the hard disk 201. Herein, references to write and/or read operations to the storage device 263 will be understood to mean operations to the medium or media (e.g., hard disk 201) of the storage device 263 unless indicated otherwise.

The storage device 263 is preferably internal to the STT 200, and coupled to a common bus 205 through an interface (not shown), such as, for example, among others, an integrated drive electronics (IDE) interface that allows internal or external connections. Alternatively, the storage device 263 can be externally connected to the STT 200 via a communication port 264. The communication port 264 may be, for example, a small computer system interface (SCSI), an IEEE-1394 interface, or a universal serial bus (USB), among others.

The device driver 211 is a software module preferably resident in the operating system 253. The device driver 211, under management of the operating system 253, communicates with the storage device controller 269 to provide the operating instructions for the storage device 263. As device drivers and device controllers are well known to those of ordinary skill in the art, further discussion of the detailed working of each will not be described further here.

In a preferred embodiment of the invention, information pertaining to the characteristics of a recorded video stream is contained in program information file 203 and is interpreted to fulfill the specified playback mode in the request. The program information file 203 may include, for example, the packet identification codes (PIDs) corresponding to the recorded video stream. The requested playback mode is implemented by the processor 244 based on the characteristics of the compressed data and the playback mode specified in the request. Video and/or audio streams that are to be retrieved from the storage device 263 for playback may be deposited in an output cache corresponding to the storage device 263, transferred to memory 249, and then transferred to the media memory 224, from where they may be retrieved and processed for playback by the media engine 222.

In one embodiment of the invention, the operating system (OS) 253, device driver 211, and controller 269 cooperate to create a file allocation table (FAT) comprising information about hard disk clusters and the files that are stored on those clusters. The OS 253 can determine where a file's data is located by examining the FAT 204. The FAT 204 also keeps track of which clusters are free or open, and thus available for use.

The DVR application 267 provides a user interface that can be used to select a desired video presentation currently stored in the storage device 263. The DVR application may also be used to help implement requests for trick mode operations in connection with a requested video presentation, and to provide a user with visual feedback indicating a current status of a trick mode operation (e.g., the type and speed of the trick mode operation and/or the current picture location relative to the beginning and/or end of the video presentation).

The DVR application is further capable of displaying visual feedback pertaining to the status of a transcoding operation. The visual feedback may indicate whether a transcoding operation is being performed. The visual feedback may also include one or more of the following:
1. A time that a first non-real-time transcoding operation was initiated.
2. A projected ending time for the first non-real-time transcoding operation.
3. An indication as to whether a program undergoing format conversion via a first non-real-time transcoding operation may be viewed while it is being transcoded.
4. Instructions to a viewer for aborting a transcoding operation (e.g., via designated user input(s)). A viewer may wish to abort a transcoding operation in order to free-up STT 200 resources for performing other STT 200 functionality.
5. Instructions to a viewer for postponing a transcoding operation.
6. Instructions to a viewer for stopping a transcoding operation (e.g., leaving a first part of a program in a second compression format generated by the transcoding operation and the remainder of the program in a first compression format (i.e., a non-transcoded format). In this manner, the viewer may be able to view a video presentation comprising a first portion encoded in a second format (e.g., a transcoded format) and a second portion encoded in a first format (e.g., a received format).

The DVR application 267 may be implemented in hardware, software, firmware, or a combination thereof. In a preferred embodiment, the DVR application 267 is implemented in software that is stored in memory 249 and that is executed by processor 244. The DVR application 267, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

When an application such as DVR application 267 creates (or extends) a video stream file, the operating system 253, in cooperation with the device driver 211, queries the FAT 204 for an available cluster for writing the video stream. As a non-limiting example, to buffer a downloaded video stream into the storage device 263, the DVR application 267 creates a video stream file and file name for the video stream to be downloaded. The DVR application 267 causes a downloaded video stream to be written to the available cluster under a particular video stream file name. The FAT 204 is then updated to include the new video stream file name as well as information identifying the cluster to which the downloaded video stream was written.

If additional clusters are needed for storing a video stream, then the operating system 253 can query the FAT 204 for the location of another available cluster to continue writing the video stream to hard disk 201. Upon finding another cluster, the FAT 204 is updated to keep track of which clusters are linked to store a particular video stream under the given video stream file name. The clusters corresponding to a particular video stream file may be contiguous or fragmented. A defragmentor, for example, can be employed to cause the clusters associated with a particular video stream file to become contiguous.

In one embodiment, the STT 200 (e.g., as directed by the DVR application 267) may output a received analog video signal (e.g., a tuned analog channel) to the television 140 while simultaneously compressing the signal in a first compression format (e.g., by compression engine 217), and storing it as a first compressed stream in the storage device 263, all on a real-time basis. According to another embodiment, while the STT 200 is compressing and storing a received analog video signal, a time-shift operation may be implemented by retrieving the corresponding first compressed video from storage device 263 after a predetermined small time-delay period (e.g., a predetermined time after the video stream in stored), decompressing it in media engine 222 and outputting it to the television 140 to effect real-time normal playback mode.

According to a further embodiment, the digitized and compressed analog video signal is decompressed and output to the television 140 only in response to user input requesting the corresponding video presentation. According to yet another embodiment, the digitized and compressed analog video signal is decompressed and output to the television 140 in a different playback mode or time-shifted by a longer time-delay only in response to user input requesting the corresponding video presentation to be played as such or to resume normal playback after a pause of the video presentation caused by the user.

The STT 200 (e.g., as directed by the DVR application 267) may also store a received compressed video stream (having a first format) in the storage device 263 while simultaneously decompressing the compressed stream in media engine 222 and outputting it to the television 140, all in real-time. Alternatively, the received compressed video stream is decompressed and output to the television 140 only in response to user input requesting the corresponding video presentation. According to yet another embodiment, the received compressed video stream is decompressed and output to the television 140 in a different playback mode or time-shifted by a longer time-delay only in response to user input requesting the corresponding video presentation to be played as such or to resume normal playback after a pause of the video presentation caused by the user.

As will be explained in more detail below, the STT 200 (e.g., as directed by the DVR application 267) may transcode a first compressed stream having a first compression format to a second compressed stream having a second compression format (e.g., of higher computational complexity than the first compression format). The second compressed stream may subsequently be decompressed and output to a television 140 responsive to user input. Transcoding a first compressed stream may involve retrieving the first compressed stream from the storage device 263, decompressing the first compressed stream, and then re-compressing the decompressed stream in a second format, as explained further below.

A video presentation that is in the process of being transcoded may be output to a television 140 prior to the completion of the transcoding operation (e.g., responsive to user input requesting playback of the video presentation). For example, a first portion of the video presentation having a second compressed format (i.e., the transcoded format) and a second portion of the video presentation having a first compressed format may be retrieved from the storage device 263, decompressed by the media engine 22 and output to the television 140.

As an example of time-shift functionality, the DVR application 267 in STT 200 is capable of displaying a tuned channel on television 140 while simultaneously storing it in compressed format in storage device 263 in real-time. In a preferred embodiment, a received analog video signal in STT 200 is displayed on television 140 and simultaneously compressed to a first compression format by compression engine 217 and stored as a first compressed stream in storage device 263. At a later time, according to resource availability as explained below, DVR application 267 causes STT 200 to retrieve the first compressed stream, decompression of the first compressed stream in media engine 222 to obtain reconstructed pictures, compression of the reconstructed pictures to a second compressed stream representative of a second compression format of higher computational complexity by employing compression engine 217, and storage of the second compressed stream in storage device 263. At yet a later time, DVR application 267 retrieves the second compressed stream, and responsive to a requested playback mode by the viewer, decompresses it in media engine 222 and displays on television 140.

As another example of time-shift functionality, the DVR application 267 causes STT 200 to compress a received analog video signal to a first compression format using compression engine 217 and to be stored it in storage device 263 as a first compressed video stream in real-time. While simultaneously conducting the compression and storage of the received analog video channel, the time-shift operation is effected by causing the retrieval of the first compressed video stream by a delayed amount of time from storage device 263, decompressing it in media engine 222 and displaying it in television 140. At a later time, according to resource availability as explained below, DVR application 267 causes the retrieval of the first compressed stream once again, decompression of the first compressed stream in media engine 222 to obtain reconstructed pictures, compression of the reconstructed pictures to a second compressed stream representative of a second compression format of higher computational complexity by employing compression engine 217, and storage of the second compressed stream in storage device 263. At yet a later time, DVR application 267 retrieves the second compressed stream, and responsive to a requested playback mode by the viewer, decompresses it in media engine 222 and displays on television 140.

As yet another example of time-shift functionality, the DVR application 267 causes STT 200 to store a received compressed video stream in storage device 263 while simultaneously decompressing the compressed stream in media engine 222 and displaying it to television 140. The received compressed video stream is representative of a first compression format. At a later time, according to resource availability as explained below, DVR application 267 causes the retrieval of the first compressed stream, decompression of the first compressed stream in media engine 222 once again to obtain reconstructed pictures, compression of the reconstructed pictures to a second compressed stream representative of a second compression format of higher computational complexity by employing compression engine 217, and storage of the second compressed stream in storage device 263. At yet a later time, DVR application 267 retrieves the second compressed stream, and responsive to a requested playback mode by the viewer, decompresses it in media engine 222 and displays on television 140.

As an example of a record operation set by a subscriber, the DVR application 267 in STT 200 receives an analog video signal in STT 200 and compresses it to a first compression format by employing compression engine 217, and stores it as a first compressed stream in storage device 263. At a later time, according to resource availability as explained below, DVR application 267 causes STT 200 to retrieve the first compressed stream, to decompress the first compressed stream in media engine 222 to obtain reconstructed pictures, to compress the reconstructed pictures to a second compressed stream representative of a second compression format of higher computational complexity by employing compression engine 217, and to store the second compressed stream in storage device 263. At yet a later time, DVR application 267 retrieves the second compressed stream, and responsive to a requested playback mode by the viewer, decompresses it in media engine 222 and displays on television 140.

As another example of a record operation set by a subscriber, the DVR application 267 causes STT 200 to store a received compressed video stream with a first compression format in storage device 263. At a later time, according to resource availability as explained below, DVR application 267 causes the retrieval of the first compressed stream, decompression of the first compressed stream in media engine 222 to obtain reconstructed pictures, compression of the reconstructed pictures to a second compressed stream representative of a second compression format of higher computational complexity by employing compression engine 217, and storage of the second compressed stream in storage device 263. At yet a later time, DVR application 267 retrieves the second compressed stream, and responsive to a requested playback mode by the viewer, decompresses it in media engine 222 and displays on television 140.

FIG. 3A is a simplified block diagram depicting data flow in a STT 200, according to one embodiment of the invention. According to the example illustrated in FIG. 3A, a compressed video stream segment 311 is retrieved from the storage device 263 and is forwarded to a decoder 223, where it is decoded. The decompressed (i.e., reconstructed) segment 312 output by the decoder 223 is then forwarded to an encoder 217 where it is compressed.

The memory 302 may serve as an interim repository for transferring data or as the repository where a decode operation outputs decoded pictures and for which encoder 217 inputs pictures to be compressed. For instance, the compressed video stream segment 311 is retrieved from the storage device 263 and placed in a section of memory 302 corresponding to an input buffer (not shown). The processor 244 (FIG. 2) initiates the retrieval operation and assists in initiating and controlling data transfers in a time-coordinated manner. The decoder 223 receives and decodes the compressed video stream segment 311. A video stream segment 312 comprising decompressed (i.e., reconstructed) pictures is output by the decoder 223 to memory 302. The video stream segment 312 is then provided to the encoder 217 for compression. Compressed pictures output by encoder 217 are placed in memory 302. The processor 244 generates new annotations as needed for the ancillary data corresponding to the transcoded video segment. The transcoded video segment is written to the storage device 263 as part of a new file. The ancillary data may be written to storage device 263 each time a write operation of transcoded video segment is performed. Alternatively, among other options, the ancillary data may be written each time multiple transcoded video segments are written to the storage device 263.

Under control of processor 244 and with the assistance of signaling and interrupt mechanisms (not shown) in STT 200, the retrieval, decompression, compression and write operations are time-coordinated with appropriate delays (e.g., are time staggered) in order to effectively implement parallel processing, preferably.

In an alternative embodiment, the decoder 223 and the encoder 217 may each store and/or retrieve data in/from a separate memory device. A compressed segment 313 output by the encoder 217, is then forwarded to the storage device 263 for storage. Since the bit-rate of the segment 313 is lower than the bit-rate of the segment 311, converting the segment 311 to the segment 313 reduces the amount of storage capacity needed for storing a corresponding video stream. Note that in an alternative embodiment, the functionality performed by the decoder 223 and by the encoder 217 can be performed by a single module.

In one embodiment, a compressed segment produced by the encoder 217 during a transcoding operation is in an interim state having an interim level of compression. The interim compression state adheres to a desired compression format specification that enables it to be decoded by a decoder (e.g., video decoder 223) capable of decoding such compression format. For instance, due to lack of available resources at a particular point in time, the encoder 217 may produce a compressed segment comprising only I pictures during a first phase of a transcoding operation. A subsequent transcoding operation or a second phase of the transcoding operation would then produce a more-compressed version of the video segment while complying with the same compression format specification. For instance, some of the compressed I pictures may be converted to B and/or P pictures during a subsequent compression operation.

According to one embodiment, a first transcoding operation may be performed in real-time while consuming fewer STT resources (e.g., memory, memory bus bandwidth, and encoder processing). The first transcoding operation may produce, for example, I pictures but not B and P pictures. Subsequent transcoding operations for achieving higher compression are then performed on a non-real-time basis while consuming a higher amount of one or more resources. Furthermore, each transcoding operation (or portion of a transcoding operation) may be performed on a real-time or non-real time basis depending on one or more factors including, for example, whether sufficient STT 200 resources are available for performing the transcoding operation on a real-time basis.

The results of each transcoding operation may also be responsive to resource availability. For example, if there are insufficient resources for performing a first type of transcoding operation that yields a first level of compression, compression format, and/or picture resolution, then a second type of transcoding operation that yields a second level of compression, compression format, and/or picture resolution, may be performed instead. Furthermore, the timing and/or number of transcoding operation that are performed on a video stream may be responsive to the availability of STT resources, as will be explained in more detail below.

Figure 3C:
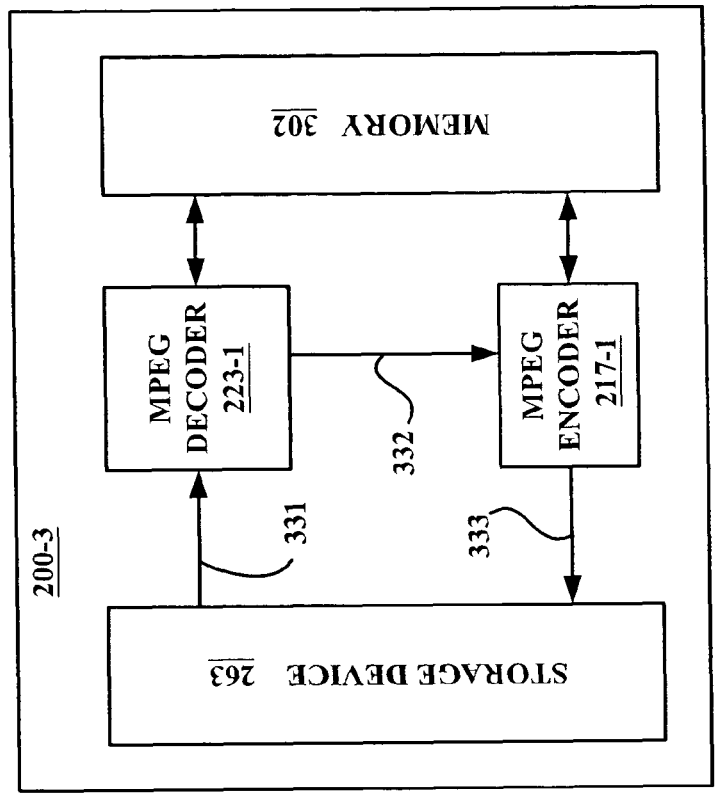
Figure 3D:
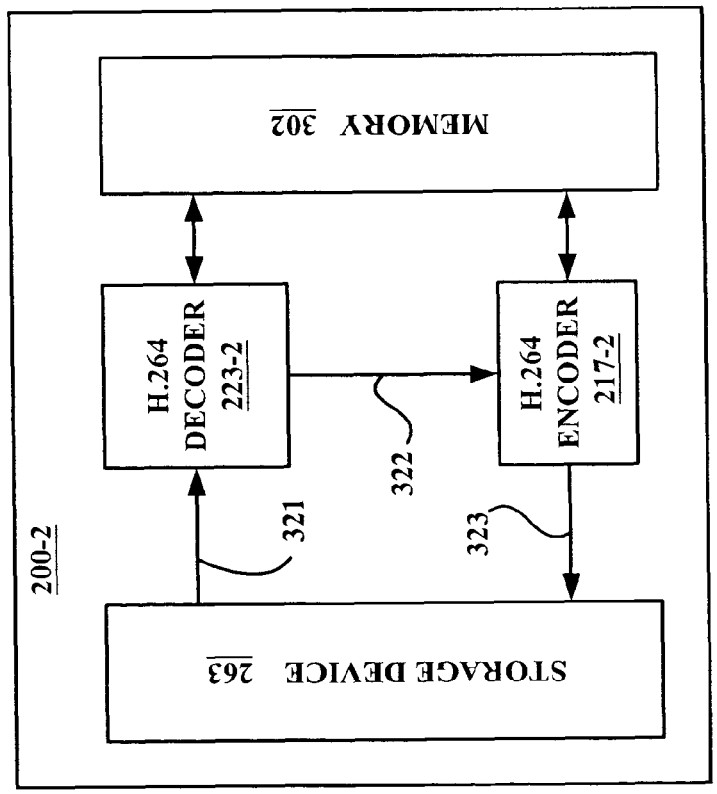

FIGS. 3B-3D depict non-limiting examples, among others, of transcoding schemes that may be implemented via a STT 200. According to the example illustrated in FIG. 3B, a first compressed stream 301 having a first compressed format (e.g., MPEG-2), is retrieved from the storage device 263 (in an STT 200-1) and is forwarded to an MPEG-2 decoder 223-1, where it is decoded (i.e., decompressed). The first compressed stream 301 is retrieved from some predetermined beginning point, such as the start of a recorded program or a point where a prior transcoding operation had ended. Segments comprising consecutive pictures in the first compressed stream 301 are accessed consecutively and provided to the decoder 223-1. One or more consecutive segments of compressed pictures may be accessed and converted from a first video compression format to a second video compression format in the STT 200-1.

Decompressed pictures 302 output by the MPEG-2 decoder 223-1 are forwarded to an H.264 encoder 217-2 where they are compressed in an H.264 format. In one embodiment, the retrieval and transcoding of first compressed stream 301 is performed in an orchestrated fashion on a segment-by-segment basis. The conversion, or transcoding operation, from a first to a second compression format may be performed in real-time if the STT 200 has sufficient resources available (e.g., due to low demand for resources by other STT operations). Examples of available STT resources include, among others, amount of memory, memory bus bandwidth, instruction execution capacity, encoding capacity in an encoder, and decoding capacity in a decoder.

The H.264 data 303 output by the H.264 encoder 217-2 is then forwarded to the storage device 263 for storage. Since the bit-rate of the H.264 data 303 is lower than the bit-rate of the MPEG-2 data 301, converting the MPEG-2 data 301 to the H.264 data 303 reduces the amount of storage capacity needed for storing a corresponding video stream. Note that in an alternative embodiment, the functionality performed by the MPEG-2 decoder 223-1 and by the H.264 encoder 217-2 can be performed by a single module (e.g., compression engine 217 (FIG. 2)).

The compression engine 217 is preferably capable of performing a number of operations in parallel according to its internal throughput capabilities and the amount of resources available. For example, the compression engine 217 may be capable of decoding and/or encoding segments of a video stream on a real-time basis and/or on a non-real-time basis. The compression engine 217 may be provided with video segments to be compressed from the storage device 263 and/or from another memory device. Compressed pictures output by the compression engine 217 may be ordered as specified by the syntax and semantics of a selected compression format. The output of the compression engine 217 may be stored in a compressed-bit-buffer prior to being transferred to storage device 263.

In another embodiment, the STT 200 is capable of performing decompression and compression operations in parallel. The parallel decompression and compression operations, or parts thereof, may be performed on a real time basis and/or on a non-real-time basis. The STT 200 may be configured to perform compression and decompression operation involving a plurality of respective picture sizes (i.e., picture resolutions), picture frame rates, and compression formats.

For illustration purposes (but without limitations), assuming that STT 200 is capable of encoding and decoding using two compression formats (e.g., MPEG-2 and H.264), two picture sizes (SD and HD), and two picture rates (e.g., 24 Hertz and 30 Hertz), then the STT 200 would be able to encode pictures using one of eight combinations of compression format, picture size, and picture rate and/or decode pictures using one of eight such combinations. As one example, among others, the available resources of the STT 200 may enable the operations identified in Table 1 to be performed in real-time and in parallel:

TABLE 1 examples of combinations of operations that may be performed in parallel

| | 1st picture size at 1st picture rate | 1st picture size at 2nd picture rate | 2nd picture size at 1st picture rate | 2nd picture size at 2nd picture rate |
|---|---|---|---|---|
| Encode in 1$^{st}$ compression format | 0 | 0 | 0 | 0 |
| Encode in 2nd compression format | 2 Operations | 1 Operation | 0 | 0 |
| Decode in 1$^{st}$ compression format | 0 | 0 | 2 Operations | 0 |
| Decode in 2nd compression format | 0 | 0 | 0 | 0 |

The two top rows of Table 1 span the eight combinations of compression format, picture size, and picture rate for encoding while the two bottom two rows span the eight combinations for decompression. In this non-limiting example, the compression engine 217 is capable of performing three compression operations in parallel (e.g., SD picture size in H.264 format) with two decompression operations (e.g., HD picture size in MPEG-2 format). As a non-limiting example, Table 1 conveys that STT 200 is capable of transcoding two MPEG-2 HD video streams to H.264 SD video streams and compressing an analog channel, all in real-time and in parallel.

Note that encoding or decoding an HD video stream requires more STT 200 resources than encoding or decoding an SD video stream. Furthermore, encoding or decoding a video stream having an H.264 format requires more STT 200 resources than encoding or decoding a video stream having an MPEG-2 format. Therefore, an SD video stream that is in an MPEG-2 format is more likely to be transcoded to an H.264 format in real-time than an HD video stream that is in an MPEG-2 format. Furthermore, an HD video stream in MPEG-2 format may be downscaled to SD and transcoded to H.264 format in real-time instead of being transcoded to an H.264 format in its larger picture resolution. Other examples may include performing fewer, different, and/or additional operations than shown in the foregoing table. Note that fewer resources may be required to enable an operation on a non-real-time basis than on a real-time basis.

Estimates for STT resources required to perform a compression or decompression operation are pre-calculated for worst-case conditions for each combination of compression format, picture size, picture rate, and time factor. The time factor identifies whether the operation is performed in real-time and provides a plurality of completion times for non-real-time operations. These estimates are stored in memory 249 and are accessible by processor 244 during a transcoding operation.

A transcoding operation from a first picture size to a second picture size may be enabled by sample-rate converters or scaling filters of multiple taps and phases in media engine 222 as the pictures are being reconstructed (i.e., decompressed). In another embodiment, the compression engine 217 can perform the scaling with sample-rate converters or scaling filters of multiple taps and phases as the pictures are input for compression. For example, in transcoding an HD video stream in an MPEG-2 format to an SD video stream in an H.264 format, the HD MPEG-2 compressed stream is decompressed, the HD pictures are reconstructed, sample-rate converters or filters downscale the reconstructed HD pictures to SD pictures, and the SD pictures are compressed to the H.264 compression format.

A resource supervisor 268 (FIG. 2) may monitor and keep track of decompression and compression operations being performed by the STT 200. The resource supervisor 268 keeps track of resource consumption for different time intervals from the resource consumption estimates stored in memory 249 for the respective operations that are currently executing and scheduled to be executed in STT 200. The resource supervisor 268 manages grants for compression and decompression operations requested by the DVR application 267 (FIG. 2) by determining available resources. The resource supervisor 268 grants permission for a real-time operation if sufficient resources are available either indefinitely or for an estimated time period. The resource supervisor 268 schedules non-real-time compression and decompression operations based on available resources and estimates of resources required for performing such operations.

FIG. 3C is a simplified block diagram depicting data flow in art a STT 200-2, according to one embodiment of the invention. According to the example illustrated in FIG. 3C, H.264 data 321 are retrieved from the storage device 263 and are forwarded to an H.264 decoder 223-2, where they are decoded. The decompressed data 322 output by the H.264 decoder 223-2 is forwarded to an H.264 encoder 217-2 where they are compressed in an H.264 format. The H.264 data 323 output by the H.264 encoder 217-2, which has a lower bit-rate than the H.264 data 321, is then forwarded to the storage device 263 for storage. Since the bit-rate of the H.264 data 323 is lower than the bit-rate of the H.264 data 321, converting the H.264 data 321 to H.264 data 323 reduces the amount of storage capacity needed for storing a corresponding video stream. Note that in an alternative embodiment, the functionality performed by the H.264 decoder 223-2 and by the H.264 encoder 217-2 can be performed by a single module. The transcoding operation depicted in FIG. 3C may be a multiple phase transcoding operation or it may be a transcoding operation for converting a larger picture size, such as HD, to a smaller picture size such as SD.

FIG. 3D is a simplified block diagram depicting data flow in a STT 200-3, according to one embodiment of the invention. According to the example illustrated in FIG. 3D, MPEG-2 data 331 is retrieved from the storage device 263 and are forwarded to an MPEG-2 decoder 223-1, where they are decoded. The decompressed data 332 output by the MPEG-2 decoder 223-1 is forwarded to an MPEG-2 encoder 217-1 where they are compressed in an MPEG-2 format. The MPEG-2 data 333 output by the MPEG-2 encoder 217-1, which has a lower-bit rate than the MPEG-2 data 331, is then forwarded to the storage device 263 for storage. Since the bit-rate of the MPEG-2 data 333 is lower than the bit-rate of the MPEG-2 data 331, converting the MPEG-2 data 331 to the MPEG-2 data 333 reduces the amount of storage capacity needed for storing a corresponding video stream. Note that in an alternative embodiment, the functionality performed by the MPEG-2 decoder 223-1 and by the MPEG-2 encoder 217-1 can be performed by a single module.

FIG. 4 is a flow chart depicting a non-limiting example of a method that may be implemented by the STT 200 depicted in FIG. 1, according to an embodiment of the invention. A video stream is encoded in a first compressed format and is stored in a storage device, as indicated in steps 401 and 402, respectively. At a later time, a video stream segment is retrieved from the storage device and is decoded, as indicated in steps 403 and 404, respectively. For non-real time transcoding operations, a decoded video segment may be stored in memory prior to being encoded at a later time.

After the video stream segment is decoded, it is then encoded in a second compressed format and is stored in the storage device, as indicated in steps 405 and 406, respectively. Steps 404 and 405 may be scheduled to be performed during time periods where sufficient STT resources are available for decoding and encoding the video segment. Furthermore, steps 403-406 may be repeated (i.e., transcoding additional segment(s) and storing them in the storage device) until the entire video stream has been transcoded. For example, as indicated by step 407, the method returns to step 403 if there are additional video segments remaining to be transcoded. The second compressed format achieved by step 405 allows the video stream (or a portion thereof) to be encoded using fewer bits. As a result, less storage capacity is used for storing the video stream after is encoded in the second compressed format.

Figure 5:
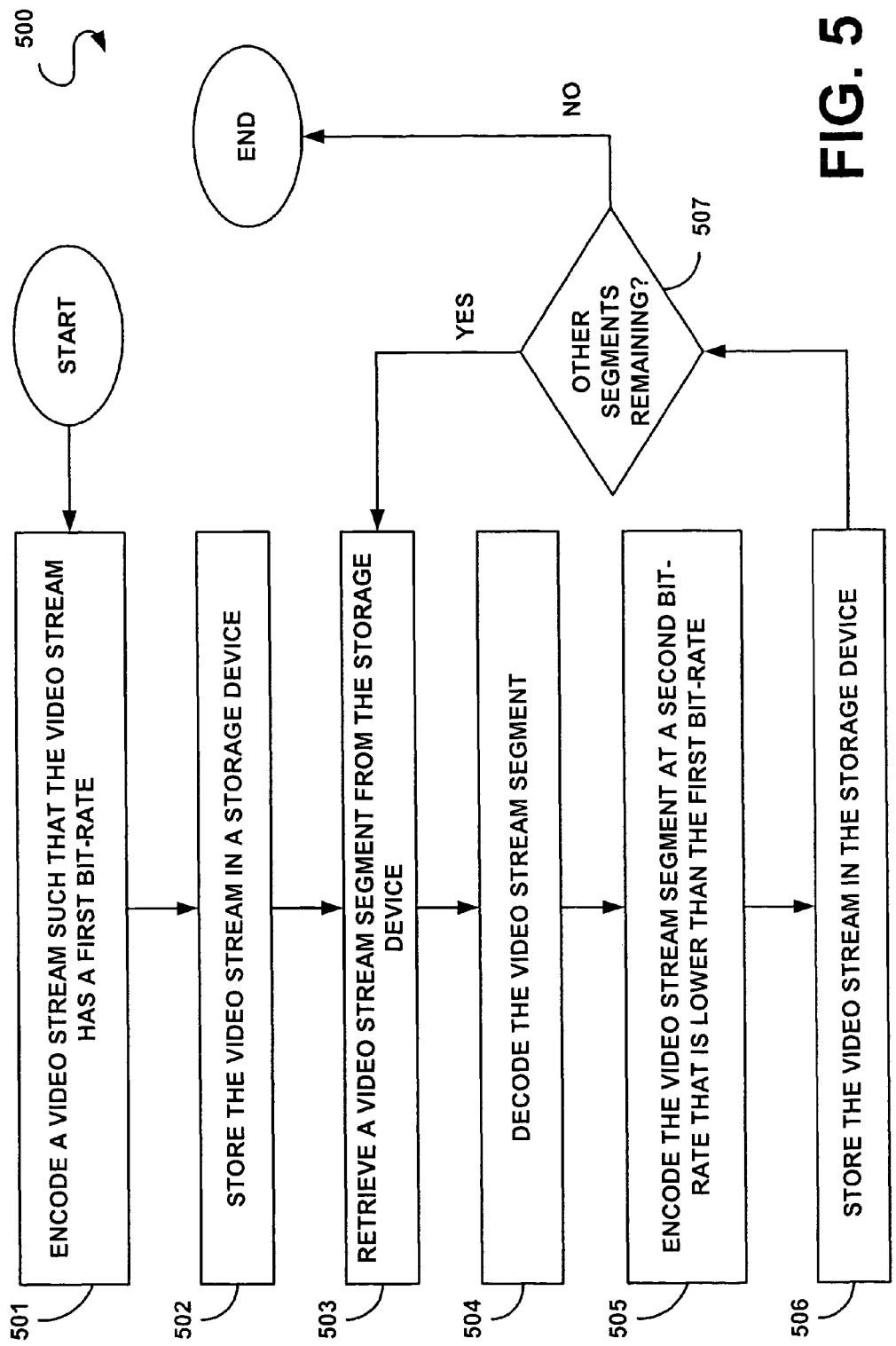
FIG. 5 is a flow chart depicting a non-limiting example of a video re-compression method that is implemented by the STT depicted in FIG. 1, according to another embodiment of the invention.

FIG. 5 is a flow chart depicting a non-limiting example of another method that may be implemented by the STT 200 depicted in FIG. 1, according to an embodiment of the invention. A video stream is encoded at a first bit-rate and is stored in a storage device, as indicated in steps 501 and 502, respectively. At a later time, a video stream segment is retrieved from the storage device and is decoded, as indicated in steps 503 and 504, respectively. The decoded pictures may be stored in memory along with information that may be used to enable an encoder to re-encode the decoded pictures. The video stream segment may then be encoded at a second bit-rate that is lower than the first bit-rate, as indicated in step 505. Steps 504 and 505 may be scheduled to be performed during time periods where sufficient STT resources are available for decoding and encoding the video segment.

After the video stream segment is encoded at the second bit-rate, it is stored in the storage device, as indicated in step 506. Steps 503-506 may be repeated (i.e., transcoding additional segment(s) and storing them in the storage device) until the entire video stream has been transcoded. For example, as indicated by step 507, the method returns to step 503 if there are additional video segments remaining to be transcoded. Encoding the video stream (or a portion thereof) at the second bit rate results in less storage capacity being used for storing the video stream.

FIG. 6 is a flow chart depicting a non-limiting example of a method 600 according to one embodiment of the invention. In step 601, video data is received by an a STT 200. If the received video data is in an analog format (e.g., received via an analog video channel), then the video data is digitized by the STT 200. Then in step 602, the video data is compressed in a manner that is responsive to the availability of STT 200 computing resources and/or to one or more characteristics of the received video stream.

For example, among others, the STT 200 may compress the video data in an H.264 format if the STT 200 has sufficient processing and bus bandwidth resources to do so in real-time without interfering with other STT 200 functionality; otherwise, the STT 200 may initially compress the video data in an MPEG-2 format, thereby imposing fewer demands on current STT 200 resources. As another example, if the video data is received in a compressed format such as, for example, MPEG-2 or H.264 (e.g., from a digital channel), then the STT 200 may initially store the received video data without subjecting it to further compression.

The compressed video data may then be re-compressed at a future time in a manner that is responsive to the availability of STT 200 computing resources and/or to one or more characteristics of the compressed video data, as indicated in step 603. For example, among others, if the compressed video data is in an MPEG-2 format, then it may be decoded and re-compressed in an H.264 format. As another example, the re-compression may be performed during one or more time intervals when there are little or no competing demands for STT 200 computing resources.

Each segment of the video data may be compressed and/or recompressed separately from the other segment during a designated time period when sufficient STT resources are available. Furthermore, the picture size, frame rate, and compression format may be responsive to available STT resources. In one embodiment, among others, step 602 may be performed on a real-time basis, while step 603 may be performed on a non-real time basis.

The manner in which received video data is compressed and/or recompressed may be responsive to, for example, among others, one or more of the following factors:

A) The format of the received video data (e.g., MPEG-2, H.264, analog, proprietary, among others).
B) The bit rate of the received video data.
C) The picture size corresponding to the received video data.
D) The frame rate of the received video data.
E) The color characteristics of the received video data.
F) The complexity of the received video data.
G) The frame types (I, P, and/or B) that are included in the received video data.
H) The availability of STT 200 processing resources.
I) The availability of STT 200 memory resources.
J) The availability of STT 200 bus bandwidth resources.
K) The availability of STT 200 storage capacity.
L) The rate of access to available storage capacity.
M) The number of encoding and decoding operations that may be required to be performed in parallel (e.g., MPEG-2 encoding, MPEG-2 decoding, H.264 encoding, and/or H.264 decoding).
N) The pattern of subscriber usage of the STT 200.

Furthermore, the manner in which a received video data is compressed and/or recompressed affects one or more of the following:

O) The picture size of the compressed and/or recompressed video data.
P) The types of frames (e.g., I, P, and/or B) included in the compressed and/or recompressed video data.
Q) The bit rate of the compressed and/or recompressed video data.
R) The time taken to compress and/or recompress the received video data.
S) Whether the recompression of the received video data is scheduled for a future time.
T) The time(s) scheduled for the recompression of the received video data.

In other words, one or more of the above characteristics O, P, Q, R, S, and T are responsive to one or more of the above factors A, B, C, . . . , and N.

FIG. 7 is a flow chart depicting a non-limiting example of a method 700 according to one embodiment of the invention. Consumption of STT 200 resources is monitored at designated time periods, as indicated in step 701. For example, among others, memory, processing and bus bandwidth usage in the STT 200 may be monitored and/or approximated over a plurality of days, weeks, or months. Then, a video data is received, as indicated in step 702. If the video data is received in an analog format, then it is digitized by the STT 200. The video data is then compressed as indicated in step 703. A first plurality of time periods are scheduled for decoding respective video segments (of the received video data) having a first bit-rate, as indicated in step 704. Furthermore, a second plurality of time periods are scheduled for encoding the decoded video segments at a second bit-rate that is lower than the first bit-rate, as indicated in step 705. The video segments are then decoded at the respectively scheduled first plurality of time periods, as indicated in step 706. The video segments are then encoded at the respectively scheduled second plurality of time periods, as indicated in step 707.

The steps depicted in FIGS. 4-7 may be implemented using modules, segments, or portions of code which include one or more executable instructions. In an alternative implementation, functions or steps depicted in FIGS. 4-7 may be executed out of order from that shown or discussed, including substantially concurrently or in reverse order, depending on the functionality involved, as would be understood by those of ordinary skill in the art.

The functionality provided by the methods illustrated in FIGS. 4-7, can be embodied in any computer-readable medium for use by or in connection with a computer-related system (e.g., an embedded system) or method. In this context of this document, a computer-readable medium is an electronic, magnetic, optical, semiconductor, or other physical device or means that can contain or store a computer program or data for use by or in connection with a computer-related system or method. Furthermore, the functionality provided by the methods illustrated in FIGS. 4-7 can be implemented through hardware (e.g., an application specific integrated circuit (ASIC) and supporting circuitry), software, or a combination of software and hardware.

It should be emphasized that the above-described embodiments of the invention are merely possible examples, among others, of the implementations, setting forth a clear understanding of the principles of the invention. Many variations and modifications may be made to the above-described embodiments of the invention without departing substantially from the principles of the invention. All such modifications and variations are intended to be included herein within the scope of the disclosure and invention and protected by the following claims. In addition, the scope of the invention includes embodying the functionality of the preferred embodiments of the invention in logic embodied in hardware and/or software-configured mediums.

What is claimed is:

1. A method comprising the steps of:
receiving plural video streams corresponding to a first format and a second format different than the first format;
encoding in parallel plural digitized pictures of a first picture sequence corresponding to a first video stream of the plural received video streams and a second picture sequence corresponding to a second video stream of the plural received video streams to produce a transport stream comprising a multiplex of a corresponding first compressed video stream and a second compressed video stream, respectively, the first and second video streams having the first format and the first and second compressed video streams having the second format;
storing the transport stream in a storage device;
determining whether the encoded pictures of the first and second compressed video streams are to be transcoded according to a first operating mode or a second operating mode relative to producing the video stream, the determination based on availability of processing resources, wherein the first operating mode is implemented in non-real time and the second operating mode is implemented in real-time; and
transcoding at least a portion of the first compressed video stream or the second compressed video stream according to either the first operating mode or the second operating mode responsive to a determination regarding the sufficiency of processing resources.

2. The method of claim 1, wherein the method is implemented by a television set-top terminal.

3. The method of claim 1, further comprising the steps of:
accessing pre-calculated resource estimates corresponding to compressing, decompressing, or a combination of both tasks pertaining to transcoding operations corresponding to the stored video streams, the pre-calculated resource estimates based on worst case conditions for one or more factors,
wherein the transcoding according to the first operating mode is in non-real time and the transcoding according to the second operating mode is in real time, the determination of which mode to execute further based on the availability of resources as determined with respect to the pre-calculated resources.

4. The method of claim 3, wherein the one or more factors includes one or more of video compression specification, picture size, picture rate, or time factor.

5. The method of claim 4, wherein the time factor provides a plurality of completion times for non-real time operations.

6. The method of claim 1, wherein the transcoding according to the first operating mode is implemented according to a second video compression specification different than a first video compression specification.

7. The method of claim 1, wherein the processing resources comprise one or more of an instruction execution resource, bus bandwidth, memory capacity, storage capacity, or access to storage capacity.

8. The method of claim 1, wherein the transcoding according to the second operating mode is according to a first video compression specification.

9. The method of claim 1, wherein the first operating mode corresponds to a first bit rate and the second operating mode corresponds to a second bit rate different than the first bit rate.

10. The method of claim 1, further comprising the step of:
monitoring consumption of the processing resources over an extended time period for different time intervals for respective operations that are currently executing and scheduled to be executed at a future time.

11. The method of claim 10, wherein the step of monitoring consumption of the processing resources comprises monitoring user input.

12. The method of claim 1, wherein the determination is further based on one or more characteristics of the video stream.

13. The method of claim 1, wherein transcoding comprises accessing in parallel the first and second compressed video streams, decompressing in parallel the encoded pictures of the first and second compressed video streams, and compressing the first compressed video stream according to the second format at a reduced bit rate and compressing the second compressed video stream according to a third format different than the first and second formats.

14. The method of claim 13, wherein the first format corresponds to analog video, and the second and third formats correspond to different video compression specifications.

15. The method of claim 1, wherein transcoding comprises accessing the portion of the first compressed video stream, decompressing the portion, and compressing the decompressed portion according to a third format different than the first and second formats, and storing the transcoded portion having the third format in the storage device.

16. The method of claim 15, further comprising accessing and decompressing the transcoded portion and non-transcoded portions of the first compressed video stream and presenting as decompressed pictures for display.

17. The method of claim 15, wherein the first format corresponds to analog video, and the second and third formats correspond to different video compression specifications.

18. The method of claim 1, wherein encoding further comprising encoding audio corresponding respectively to the first and second video streams and multiplexing the encoded audio in the transport stream.

19. A set-top terminal (STT) comprising:
an encoder configured to compress plural digitized pictures of a picture sequence according to a first video compression specification to produce a video stream;
determine logic configured to determine whether the video stream is to be transcoded according to a first operating mode or a second operating mode relative to producing the video stream, the determination based on availability of processing resources;
transcode logic configured to transcode the video stream according to either the first operating mode or the second operating mode responsive to a determination regarding the sufficiency of processing resources; and
a multiplexer, wherein the encoder is further configured to:
receive, in parallel to the plural digitized pictures, second plural digitized pictures of a second picture sequence and compressed pictures, the received second plural digitized pictures corresponding to a first format; and
further compress, in parallel to the plural digitized pictures of the picture sequence, the second plural digitized pictures of the second picture sequence to produce, in association with the multiplexer, a transport stream comprising a multiplex of the video stream and the compressed second plural digitized pictures, the transport stream pictures corresponding to a second format different than the first.

20. The STT of claim 19, wherein the first operating mode corresponds to a higher compression rate than the second operating mode.

21. The STT of claim 19, wherein the second operating mode corresponds to an MPEG-2 video compression specification and the first operating mode corresponds to an H.264 video compression specification.

22. The STT of claim 19, wherein the STT is integrated in a subscriber television system.

23. The STT of claim 19, wherein the first operating mode is implemented in non-real time and the second operating mode is implemented in real-time.

24. The STT of claim 19, wherein the determine logic is further configured to:
access pre-calculated resource estimates corresponding to compressing, decompressing, or a combination of both tasks pertaining to transcoding operations corresponding to a stored video stream, the pre-calculated resource estimates based on worst case conditions for one or more factors,
wherein the transcode logic is further configured to transcode according to the first operating mode in non-real time and according to the second operating mode in real time, the determination of which operating mode to execute further based on the availability of resources as determined with respect to the pre-calculated resources.

25. The STT of claim 24, wherein the one or more factors includes one or more of video compression specification, picture size, picture rate, or time factor.

26. The STT of claim 25, wherein the time factor provides a plurality of completion times for non-real time operations.

27. The STT of claim 19, wherein the transcode logic is further configured to transcode according to the first operating mode implemented according to a second video specification different than the first video specification.

28. The STT of claim 19, wherein the processing resources comprise one or more of an instruction execution resource, bus bandwidth, memory capacity, storage capacity, or access to storage capacity.

29. The STT of claim 19, wherein the second operating mode is according to the first video specification.

30. The STT of claim 19, wherein the first operating mode corresponds to a first bit rate and the second operating mode corresponds to a second bit rate different than the first bit rate.

31. The STT of claim 19, wherein the determine logic is further configured to:
monitor consumption of the processing resources over an extended time period for different time intervals for respective operations that are currently executing and scheduled to be executed at a future time.

32. The STT of claim 31, wherein the monitoring comprises monitoring user input.

33. The STT of claim 19, wherein the determination is further based on one or more characteristics of the video stream.

34. The STT of claim 19, wherein the transcode logic is further configured to access in parallel the video streams of the transport stream, decompress in parallel the compressed plural digitized pictures of the video stream and the compressed second plural digitized pictures, and compress the decompressed pictures of the video stream according to the second format at a reduced bit rate and compress the decompressed second plural digitized pictures according to a third format different than the first and second formats.

35. The STT of claim 34, wherein the first format corresponds to analog video, and the second and third formats correspond to different video compression specifications.

36. The STT of claim 19, wherein the transcode logic is further configured to access a portion of the video stream, decompress the portion, compress the decompressed portion according to a fourth format different than the first and second formats, and store the transcoded portion having the fourth format in a storage device, the transcoded portion comprising the compressed, decompressed portion.

37. The STT of claim 36, further comprising accessing and decompressing the transcoded portion and non-transcoded portions of the video stream and present as decompressed pictures for display.

38. The STT of claim 36, wherein the first format corresponds to analog video, and the second and fourth formats correspond to different video compression specifications.

39. The STT of claim 19, wherein the encoder is further configured to compress audio corresponding respectively to the video streams of the transport stream, and wherein the multiplexer is configured to multiplex the compressed audio in the transport stream.

* * * * *